UNITED STATES PATENT OFFICE.

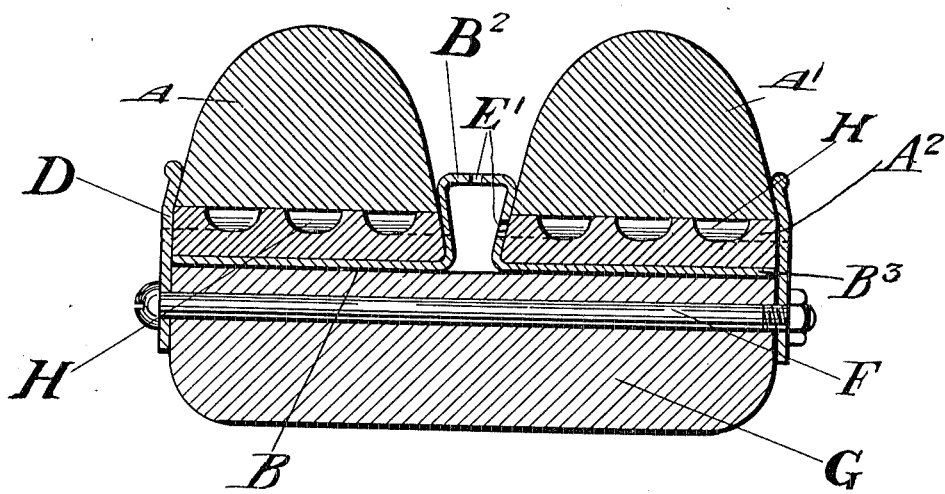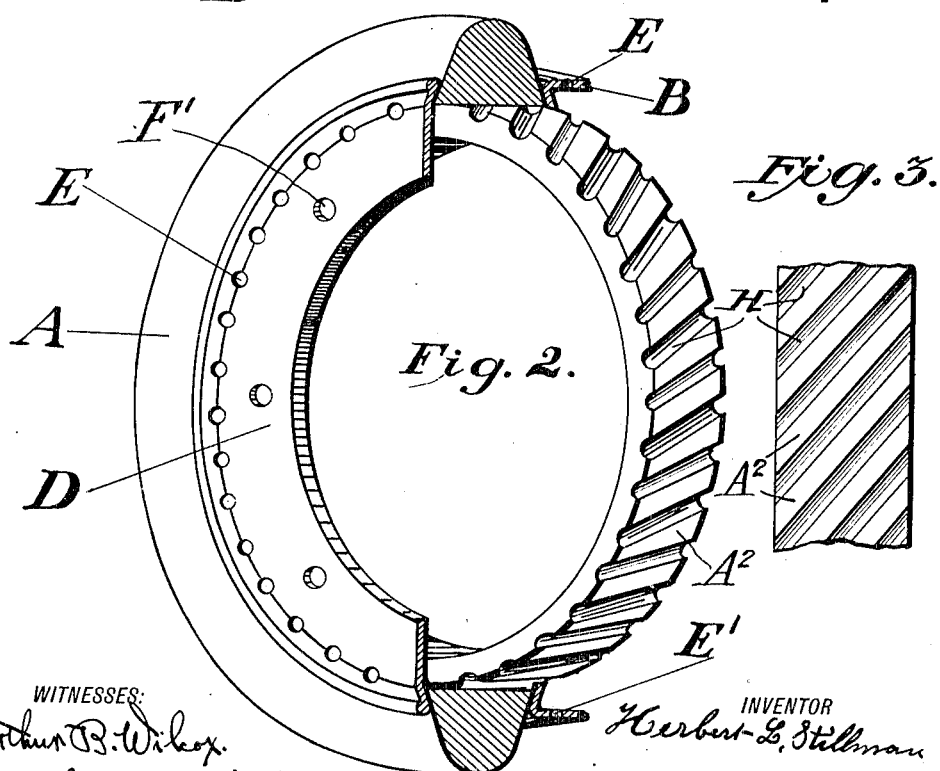

HERBERT L. STILLMAN, OF WESTERLY, RHODE ISLAND.

TIRE FOR VEHICLE-WHEELS.

1,080,385.  Specification of Letters Patent.  Patented Dec. 2, 1913.

Application filed February 23, 1911. Serial No. 610,376.

*To all whom it may concern:*

Be it known that I, HERBERT L. STILLMAN, of Westerly, in the county of Washington and State of Rhode Island, have invented certain new and useful Improvements in Tires for Vehicle-Wheels, the same being an improvement on my United States Patent No. 666,571, bearing date of January 22, 1901; and I do hereby declare the following to be a full, clear, and exact description thereof, reference being had to the accompanying drawings, forming a part of this specification, and to the letters of reference marked thereon.

This invention has relation to improvements in vehicle tires having rubber or elastic dual or double tires with a central tread of metal with improvements for providing sub-elastic tires and for sub-air cooling of the same, and may be used under a single tire.

The invention will be fully understood from the following description when taken in connection with the accompanying drawings in which—

Figure 1 is a cross sectional view of a wheel rim with resilient tires secured thereto. Fig. 2 is a perspective view of sub-tire, with part of outer tire thereon. Fig. 3 is a plan view of the sub tire showing the transverse recesses.

Referring by letter to said drawings A shows dual or double tires consisting of a tread portion A' and a subresilient portion $A^2$; B shows metal rim having hollow raised central portion $B^2$ and laterally extending side portions $B^3$ said hollow portion provided with openings E', in its top and sides; D shows side plates employed; E shows openings in side plates for air circulation; F shows longitudinal section of bolt fastenings; F' shows rim openings for the same; G shows section of felly and H shows flute openings in sub-resilient tire, the flute openings registering with the openings in the sides of the hollow raised portion and the side plates. It will thus be seen that the addition of the sub-tire, preferably to be made of rubber, performs office of additional resiliency.

It will also be seen that economy in the rubber is obtained as the sub-tires are not subject to wear and may outlast many surface tires, and as heating of solid tires tends to much shorten the wearing life of them. The additional sub-air cooling surface serves the purpose of keeping the wearing tire much cooler thereby, and allowing faster running of car, the air entering in the central tread and making its exit through the sub-tire flutes and opening in side plates.

Having thus described my invention I claim:—

In combination a wheel rim having a hollow raised middle portion, said raised middle portion being provided with spaced perforations along its periphery and sides, side plates, also provided with perforations, said raised portion forming with each of said side plates tire receiving seats, rubber tires seated in said seats and provided on their inner sides with spaced parallel grooves forming air spaces, said grooves being alined with said perforations in said side plates and raised portion of the rim in and for the purpose set forth.

HERBERT L. STILLMAN.

Witnesses:
 MADELINE D. RITCHIE,
 ARTHUR B. WILCOX.